United States Patent Office 2,703,336
Patented Mar. 1, 1955

2,703,336

ELECTRICAL ACCUMULATOR AND SEPARATOR

Gordon B. Lucas, Oak Park, Ill., assignor to The Richardson Company, Cincinnati, Ohio, a corporation of Ohio No Drawing. Application July 29, 1952,
Serial No. 301,599

9 Claims. (Cl. 136—146)

My invention relates to electrical accumulators of the lead-acid type and it has for its principal objects the provision of an accumulator having a substantially enhanced service life and the provision of a mode of attaining the enhanced service life through the use of structures as hereinafter described.

These and other objects of the invention, which will be set forth hereinafter, or will be apparent to one skilled in the art upon reading these specifications, I accomplish in those structures and procedures of which I shall now set forth certain exemplary embodiments.

As is well known, the lead-acid accumulators of commerce comprise a suitable container, usually of the multi-cell type, and positive and negative plates positioned alternately, plates of the same kind being connected in parallel to external terminal or connector posts. Alternate positive and negative plates are held apart and prevented from short circuiting by porous membranes of insulating character called "separators"; and the assembly is immersed in a suitable sulfuric acid electrolyte.

It is also well known that in the service life of such an accumulator, especially where it is operated under adverse conditions, including excessive rates of charge and discharge, the positive plates form the starting point for ultimate failure of the structure in most instances. The continued action of the accumulator results in such phenomena as disintegration and loss of the active material in the grid spaces of the positive plates, deformation of the positive plates, and finally disintegration of the metal forming the grids of the positive plates. These action are both complex and interrelated; but it is believed that a species of oxidative attack is a primary factor both in the disintegration of the active materials in the positive plates and in the deformation and disintegration of the metal parts of the plates themselves.

In the practice of my invention, I utilize the fact that the presence of a cobalt-containing compound is capable of minimizing to a very great extent the phenomena just discussed. The cobalt-containing compound is effective when present in the electrolyte in very small quantities, as hereinafter set forth. A very serious disadvantage encountered in attempts to employ cobalt-containing compounds in the way indicated lies in the fact that a very rapid destruction of the separators occurs in the presence of the cobalt and electrolytic action. The chemical explanation for this destruction is not kown to me; but the fact remains that in lead-acid accumulators where the electrolyte contains minute quantities of cobalt, I have uniformly encountered accelerated destruction of separators made of wood, or of microporous rubber, or separators which include in their construction cellulosic fibers with or without resinous binders, combinations of cellulosic fibers with other fibrous materials such as glass, and resinous substances, separators including glass fibers and mineral substances, and the like. All of these separators appear to undergo a progressive disintegration to an extent to impair service life; they not only become thinner, but frequently become characterized by a plurality of relatively large holes or apertures. Other forms of disintegration also occur in which the separators lose body portions not tightly confined between adjacent plates. It will be evident to the skilled worker in the art that these conditions permit shorting of the cells of the battery and interfere with the attainment even of a satisfactory service life.

I have ascertained, however, that certain resinous separators are unaffected by the presence of cobalt-containing compounds under electrolytic conditions. These separators are ones having a porous body consisting of or comprising preponderantly a resin of the styrene or polyethylene types, or a resin of the vinvl type. By a resin of the vinyl type I mean to include not only all straight vinyl resins such as polymerized vinyl chlorides, vinyl acetates and the like, but also the vinyl copolymers such as copolymers of vinyl or vinylidine chloride and acetate. I also mean to include resinous bodies comprising essentially or preponderantly such vinyl resins along with other binder materials, such as thermosetting resins (e. g. phenol-formaldehyde or phenol-furfural resins) and other resinous substances such as polystyrenes, polyethylenes, nylons and the like; and the resistance of such bodies to disintegration in the presence of cobalt-containing compounds appears unaffected by the presence of plasticizing agents where these are deemed desirable. The separators to which I refer are free of cellulosic fibers or substances. In general, they are produced by mixing into the resinous matrix a quantity of finely divided substance which may be removed by leaching with or without chemical action, whereby to impart porosity. The mixed mass is formed into sheets in a suitable fashion, and any volatile solvent content is removed therefrom. If the formed sheets contain a thermosetting resin, this is caused to set up, after which the leaching is performed to remove the porosity imparting substance.

The employment of separators of this type permits the attainment of the primary objects of this invention. Since the separators do not disintegrate and thereby shorten the service life of the accumulator, the use of minor quantities of cobalt-containing substance, I have found, becomes effective in increasing the service life of the accumulator very greatly, in some instances fully doubling the service life by preventing the destruction of the positive plates as set forth above, and as shown by accelerated tests.

The quantity of cobalt-containing substance required for the practice of the invention is minute. The cobalt becomes effective as an ingredient of the electrolyte; and I have found, by way of example, that the objects of the invention are attained under the circumstances outlined when as little as .15% (1500 parts per million) of cobalt calculated as cobalt oxide is present in the electrolyte.

The manner in which the cobalt is made available does not constitute a limitation on the broader aspects of this invention. The cobalt may be added, for example, in the form of a soluble salt to the electrolyte, or the cobalt may be incorporated in suitable form in the paste of active materials in the grid openings of the positive plates.

In the manufacture of lead-acid electrical accumulators, it is necessary to "form" the plates. Suitable positive and negative plates which are grids of lead or lead alloy are "pasted" with active materials such as oxides of lead together with suitable carrying substances and a vehicle, and are allowed to dry. The positive and negative plates are then assembled with separators and electrolytically oxidized and reduced in a suitable sulfuric acid electrolyte.

In this way many electrical accumulators are produced for immediate service; but in other instances the formed positive and negative plates while separated are appropriately dried, reassembled with dry separators and sealed in containers so as to produce either the so-called dry uncharged or the dry charged accumulators of commerce. These may be shipped in the dry condition to the point of use. When ready for service, an electrolyte is added. The accumulators may be immediately used if they are of the dry charged type or first subjected to a charging treatment if they are of the dry uncharged type.

It will be seen that under these circumstances there may frequently be inconvenience in attempts to add soluble cobalt-containing substances to the electrolyte. Further, there are certain disadvantages in adding these substances to the pastes in the positive plates. I contemplate as one feature of my invention the manufacture and provision of separators containing or incorporating the cobalt-containing compound. This has a number of advantages. It insures automatically the presence of cobalt in the battery and avoids the necessity of any extraneous treatment of the electrolyte. It avoids not only the disadvantages of incorporating the cobalt-containing substance or substances in the grid pastes, but also minimizes loss of these substances to the initial electrolyte used in "forming" the plates. In those processes where two-stage formation is employed the forming electrolyte is replaced with new electrolyte before placing the battery in service.

The cobalt-containing substances may be incorporated in the vinyl type separators in a number of ways. It is readily possible to take a completely formed separator or completely processed separator stock and immerse it in a solution of soluble cobalt salts, afterward drying the separator or stock without rinsing so as to deposit a sufficient quantity of cobalt salt in and on it.

A preferable procedure, however, is to incorporate the cobalt in the matrix during the manufacture of the separators. In doing so, I add to the original mass a quantity of cobalt-containing substance which is incorporated into the resinous matrix along with the leachable substance. It is desirable, however, to have the cobalt-containing compound in a form which will not be removed from the separator and lost during the leaching treatment. Thus, my objects here are to employ a form of cobalt compound which will not be attacked and removed by the leaching solvents or chemical reagents, but which will be attacked by the sulfuric acid electrolyte during the service life of the accumulator and converted to a form soluble in the electrolyte so as to become available for its intended purpose. Preferably I employ the cobalt in a form which will be relatively slowly attacked by the electrolyte. A material adequately filling all of these requirements is cobalt oxide. I have found that it may be incorporated (in the quantities required) in the resinous matrices of the type of separators to which I have referred herein along with the porosity imparting ingredients, that it remains in the separator through the leaching treatment or treatments to which it is subjected, and that it does not in any way adversely affect any of the properties of the ultimate separators as such.

Reference is here made to the copending application of Gordon H. Fernald (assigned to the assignee of this application), Serial No. 245,477, filed September 7, 1951, and entitled "Porous Separator and Method of Making It." In this application there is made a general teaching of a porous separator which is produced by incorporating in a binder a quantity of surface-active agent, a solvent, and a relatively large quantity of finely divided leachable substance. The initial presence of the surface-active agent in the mix was found by Fernald to be effective in producing porous separators having exceptionally low electrical resistance in use, an electrical resistance lower than that hitherto encountered in any type of separator, making for a very much superior performance of the accumulators on the cold, high amperage discharge test. In the light of my teachings above, the resinous matrix of the separators should be of the indicated resinous character. The copending application preferably uses finely divided salt (sodium chloride) as the porosity imparting agent. A typical formula, which has given excellent results in the manufacture of storage battery separators with an all-thermoplastic binder, is as follows:

| | Parts by weight |
|---|---|
| Thermoplastic resin (preferably polyvinyl chloride or the acetate copolymer, and having a molecular weight of 25,000 or higher) | 100 |
| Salt | 1000 |
| Dutrex-20 | 12–20 |
| Solvent (di-isobutyl-ketone or other suitable solvent) | 100 |
| "Sulfonated red oil" | 30 |

A typical formula for a separator in which the binder is a combination of thermoplastic and thermosetting resins is as follows:

| | Parts |
|---|---|
| Thermoplastic resin (such as vinyl chloride-acetate copolymer) | 150 |
| Phenol-furfural resin | 50 |
| "Sulfonated red oil" | 50 |
| Solvent (e. g. Cellosolve acetate) | 150 |
| Salt | 1700 |

The substance "Dutrex-20" in the first of the above formulae is an aromatic petroleum extract employed as a plasticizer. The "sulfonated red oil" is a material commercially available under this name, which actually is a sulfated oleic acid. It is typical of surface-active agents which may be employed for the purpose set forth above.

To either of the above formulae (which are illustrative and not limiting), I may add a relatively small quantity of cobalt oxide. The quantitative limitations are not strict. In my commercial work, where the separator mixes are made up in batches of about 40 pounds each, I add from 10 to 50 grams of finely divided cobalt oxide making sure that the material is well dispersed. The initial mix is made in an extrusion machine having screws with reversed portions; and the plasticized and homogenized mass is preferably extruded from the mixing machine through an orifice which shapes it to continuous sheet form with ribs, if ribs are desired. The shaped material is subjected to drying for the removal of the solvent and to heat for setting purposes if it contains a thermosetting resin, after which the material is passed through an elongated trough through which hot water passes in countercurrent to the material to remove the salt. A drying step and cutting to size complete the manufacture of the separators. The cobalt oxide is not removed during the leaching treatment but remains in the separators for use as hereinabove described.

Where herein I have referred to soluble cobalt compounds either for addition to an electrolyte, a paste, or to a separator, these may include any soluble salts of cobalt which contain no radicals adversely affecting the electrolyte. Thus I may employ cobalt sulfate, or nitrate, although nitrates are not ordinarily desirable in accumulator electrolytes. Also organic cobalt compounds may be used.

Modifications may be made in my invention without departing from the spirit of it. Having thus described my invention in certain exemplary embodiments, what I claim as new and desire to secure by Letters Patent is:

1. A separator for a lead-acid type electrical accumulator, said separator having a porous body consisting essentially of resin chosen from a class consisting of vinyl, styrene, polyethylene and nylon resins, and containing also a small quantity of a cobalt compound, incorporated in said porous body.

2. A separator for a lead-acid type electrical accumulator, said separator consisting essentially of a porous body of vinyl-type resin, and containing also a small quantity of a cobalt compound, incorporated in the said porous body.

3. The structure claimed in claim 2 in which the said cobalt compound is soluble in a surfuric acid electrolyte.

4. The structure claimed in claim 2 in which the said cobalt compound is cobalt oxide in intimate dispersion in the resinous body of said separator.

5. The structure claimed in claim 2 in which said resinous body is a vinyl-chloride-vinyl acetate copolymer.

6. The structure claimed in claim 2 in which said resinous body is poly-vinyl chloride.

7. An electrical accumulator of the lead-acid type having positive and negative plates assembled with porous separators consisting essentially of resin chosen from a class consisting of vinyl, styrene, polyethylene, and nylon resins, and an acid electrolyte, said separators having initially incorporated therein a cobalt compound capable of causing said acid electrolyte to contain a small quantity of a soluble cobalt compound.

8. The structure claimed in claim 7, in which the cobalt compound initially incorporated in the said separators is cobalt oxide.

9. In a process of making improved storage battery separators, the steps of mixing into a resinous matrix a quantity of finely divided water soluble substance as a filler and also a quantity of a cobalt compound difficulty soluble, if at all, in water under leaching conditions, sheeting the mixed mass and leaching the leachable filler therefrom with water so as to leave incorporated in the resultant porous resinous body at least the major quantity of said cobalt compound.

References Cited in the file of this patent

UNITED STATES PATENTS

| | | |
|---|---|---|
| 266,262 | Shaw | Oct. 17, 1882 |
| 368,608 | Peyrusson | Aug. 23, 1887 |
| 1,826,724 | Booss et al. | Oct. 13, 1931 |
| 1,944,066 | Chamberlain | Jan. 16, 1934 |
| 2,101,326 | Woodbridge | Dec. 7, 1937 |
| 2,187,638 | Zernike | Jan. 16, 1940 |
| 2,543,106 | Harriss | Feb. 27, 1951 |

FOREIGN PATENTS

| | | |
|---|---|---|
| 797,547 | France | Apr. 28, 1936 |
| 565,871 | Great Britain | Dec. 1, 1944 |